(12) United States Patent
Lee et al.

(10) Patent No.: US 9,471,843 B2
(45) Date of Patent: *Oct. 18, 2016

(54) APPARATUS AND METHOD FOR ULTRA-HIGH RESOLUTION VIDEO PROCESSING

(71) Applicant: SAMSUNG ELECTRONICS CO., LTD., Suwon-si, Gyeonggi-do (KR)

(72) Inventors: Jaejoon Lee, Seoul (KR); Kwon Ju Yi, Yongin-si (KR); Du-Sik Park, Suwon-si (KR); Il Soon Lim, Hongseong-gun (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/154,739

(22) Filed: Jan. 14, 2014

(65) Prior Publication Data

US 2014/0126837 A1 May 8, 2014

Related U.S. Application Data

(63) Continuation of application No. 12/453,935, filed on May 27, 2009, now Pat. No. 8,666,192.

(30) Foreign Application Priority Data

Oct. 8, 2008 (KR) .................... 10-2008-0098841

(51) Int. Cl.
*G06K 9/36* (2006.01)
*G06T 1/20* (2006.01)

(52) U.S. Cl.
CPC .. *G06K 9/36* (2013.01); *G06T 1/20* (2013.01)

(58) Field of Classification Search
USPC ........................ 382/199, 260, 276
See application file for complete search history.

(56) References Cited

U.S. PATENT DOCUMENTS

| 5,870,109 A | 2/1999 | McCormack et al. |
| 6,356,589 B1 | 3/2002 | Gebler et al. |
| 6,388,711 B1 | 5/2002 | Han et al. |
| 2003/0174768 A1 | 9/2003 | Hall et al. |

FOREIGN PATENT DOCUMENTS

| JP | A2000-312311 | * 11/2000 |
| JP | 2008-052472 | 3/2008 |
| JP | 2008-085474 | 4/2008 |
| KR | 10-2001-0035705 | 5/2001 |

(Continued)

OTHER PUBLICATIONS

Korean Office Action dated Jul. 1, 2014 in Korean Patent Application No. 10-2008-0098841, 9 pages.

(Continued)

*Primary Examiner* — John Strege
(74) *Attorney, Agent, or Firm* — Harness, Dickey & Pierce, P.L.C.

(57) ABSTRACT

A video processing apparatus and method is provided. The video processing apparatus divides video data and then processes a current divided area of the divided video data by referring to pixels in an adjacent divided area while processing the current divided area, thereby minimizing artifacts generation along a boundary between divided areas when the processed divided areas are subsequently merged.

14 Claims, 4 Drawing Sheets

(56) References Cited

FOREIGN PATENT DOCUMENTS

KR  10-2007-0042138  4/2007
KR  10-2007-0077381  7/2007

OTHER PUBLICATIONS

Ishfaq Ahmad et al., "Video compression with parallel processing", Parallel Computing, vol. 28, 2002, pp. 1039-1078.
Chinese Office Action dated Feb. 5, 2013 from Chinese Patent Application No. 200910174136.3.
Ahmad I et al: "Video Compression With Parallel Processing", Parallel Computing, Elsevier Publishers, Amsterdam, NL, vol. 28, No. 7-8, Aug. 1, 2002 pp. 1039-1078.
Ueda H et al: A Multiprocessor System Utilizing Enhanced DSPs for Image Processing, Systolic Arrays, 1988., Proceedings of the International Conference on San Diego, CA, USA May 25-27, 1988, Washington, DC, USA, May 25, 1988.
Nishitani T et al: "A Real-Time Software Programmable Processor for HDTV and Stereo Scope Signals", Application Specific Array Processors, 1990. Proceedings of the International Conference on Princeton, NJ, USA Sep. 5-7, 1990, pp. 226-234.
Extended European Search Report issued Dec. 7, 2009 corresponds to European Patent Application 09170798.4.
Office Action mailed Mar. 28, 2012 in U.S. Appl. No. 12/453,935.
Office Action mailed Aug. 6, 2012 in U.S. Appl. No. 12/453,935.
Advisory Action mailed Nov. 14, 2012 in U.S. Appl. No. 12/453,935.
Office Action mailed Jul. 9, 2013 in U.S. Appl. No. 12/453,935.
Notice of Allowance mailed Oct. 15, 2013 in U.S. Appl. No. 12/453,935.
U.S. Appl. No. 12/453,935, filed May 27, 2009, Jaejoon Lee et al., Samsung Electronics Co., Ltd.

* cited by examiner

APPARATUS AND METHOD FOR ULTRA-HIGH RESOLUTION VIDEO PROCESSING

CROSS-REFERENCE TO RELATED APPLICATIONS

This application is a continuation of U.S. patent application Ser. No. 12/453,935, filed on May 27, 2009, which is currently pending, and claims the priority benefit of Korean Patent Application No. 10-2008-0098841, filed on Oct. 8, 2008, in the Korean Intellectual Property Office, the disclosures of which are incorporated herein by reference.

BACKGROUND

1. Field

One or more embodiments relate to processing video data, and more particularly to processing video data by dividing the video data and processing the divided video data with reference to pixels in adjacent divided areas. The processing of the divided video data with reference to video data in adjacent divided area may act to minimize artifact generation.

2. Description of the Related Art

With the introduction of Digital Cinema video processing, sharply followed by processing techniques for 1920×1080 Full High Definition (HD), there has been a progression toward techniques for processing ever more higher resolution videos, such as ultra-high resolution videos. When such ultra-high resolution videos are processed in real-time, the higher clock speed needed to process large volumes of data should be considered, along with issues of generated heat in the system, electricity consumption, and the like. In particular, in the processing of an ultra-high resolution video, such as a 4096×2160 digital cinema video or a 3840×2160 Ultra-High Definition (UHD) video, there is currently a requirement for an interface with a large bandwidth capability for transmitting the substantial video data to a display device to better accommodate the large data volume. As an example, for digital cinema, an interface with a bandwidth of 4096 pixels×2160 pixels×60 Hz=530 MHz has been required.

Accordingly, in processing of ultra high resolution videos, such ultra high resolution videos have been divided prior to the processing to increase the processing speed.

Here, each of divided portions of the video may be considered and processed as independent videos, e.g., they may be processed in parallel. After the parallel processing, the divided portions of the video can be merged and then displayed.

However, since the divided portions of the video may be processed as independent videos, artifacts may be generated along boundary areas between the divided portion of the video, i.e., where these divided portions of the video are merged, upon their merger or successive display. As an example, the processing and displaying of a single video would not result in such artifact generation, while artifacts would be generated along boundary areas when multiple divided videos are merged and displayed.

SUMMARY

According to one or more embodiments, there may be provided an ultra-high resolution video processing apparatus including a video division unit to divide video data into at least two areas, and a video processing unit to process the divided video data by referring to pixel data in an adjacent area to the divided areas.

According to one or more embodiments, there may be provided an ultra-high resolution video processing apparatus, the apparatus including a video division unit to divide video data into at least two divided areas of video data, and a video processing unit to process the divided video data, with the processing of the divided video data including processing pixel data of one of the at least two divided areas by referring to select pixel data of an adjacent divided area, of the at least two divided areas, separate from a processing of pixel data, including the select pixel data, of the adjacent divided area.

According to one or more embodiments, there may be provided an ultra-high resolution video processing method, the method including dividing video data into at least two divided areas of video data, and processing the divided video data by processing pixel data of one of the at least two divided areas by referring to select pixel data of an adjacent divided area, of the at least two divided areas, separate from a processing of pixel data, including the select pixel data, of the adjacent divided area.

BRIEF DESCRIPTION OF THE DRAWINGS

These and/or other aspects, features, and advantages of example embodiments will become apparent and more readily appreciated from the following description, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
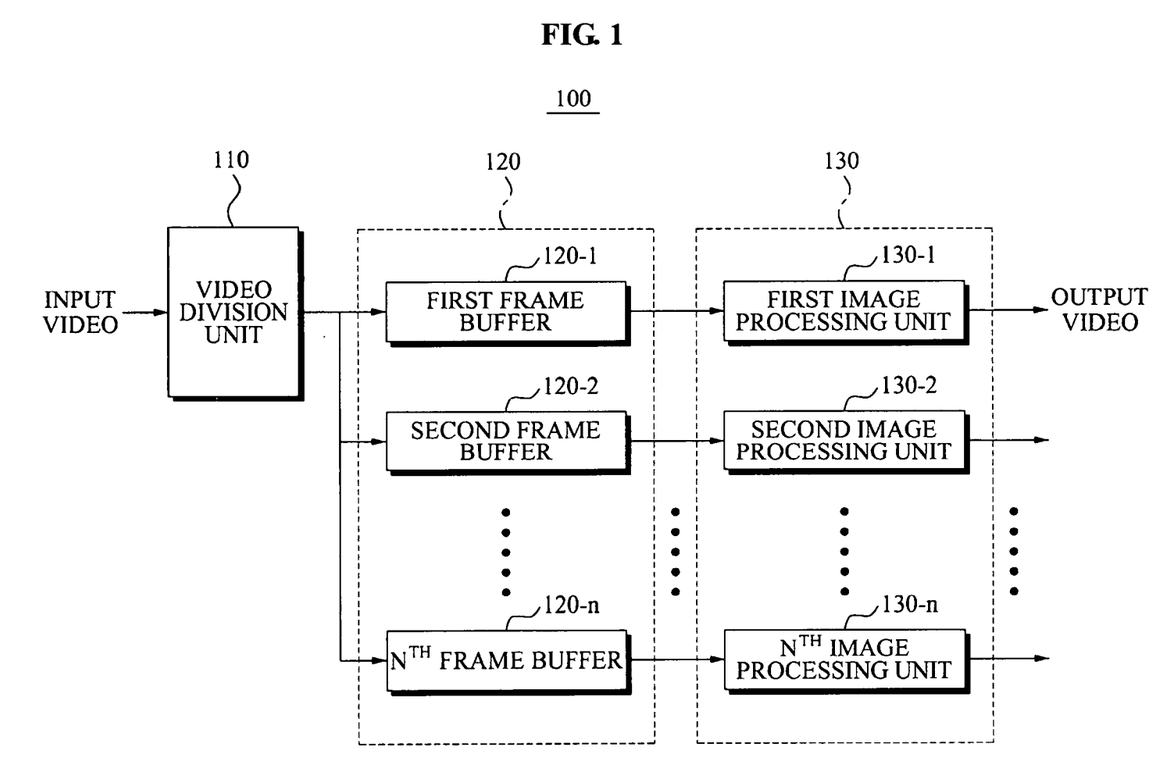
FIG. 1 illustrates a configuration of a video processing apparatus, according to one or more embodiments.

FIG. 1 illustrates a configuration of a video processing apparatus 100, according to one or more embodiments. Herein, throughout the following description, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing elements. As only another example, a respective apparatus/system or method could also be controlled through one or more processing elements/devices or implemented by a distributed network, noting that additional and alternative embodiments are equally available.

Referring to FIG. 1, the video processing apparatus 100, according to one or more embodiments, may include a video division unit 110, a data storage unit 120, and a video processing unit 130, for example.

The video division unit 110 may receive video data and divide the input video data into at least two areas.

The video division unit 110 may divide the video data into at least two areas based on a predetermined direction, for example. In such an embodiment, when the predetermined direction is a lengthwise direction, e.g., a time-wise direction of the video data, the video division unit 110 may divide the video data into at least two areas based on the lengthwise direction.

In an embodiment, the video division unit 110 may alternatively divide the video data into at least two areas based on a heightwise/horizontal direction when the predetermined direction is a heightwise direction.

In another embodiment, the video division unit 110 may divide the video data into at least two areas in a lengthwise direction and divide the video data again into at least two areas in a heightwise direction, when the predetermined direction is a lengthwise direction and a heightwise direction. Here, it is briefly noted that the described lengthwise or heightwise division controlling directions should not be interpreted as limiting embodiments, as alternative division In an embodiment, the data storage unit 120 may respectively store pixel data for each of the at least two areas, each collectively with pixel data of an area(s) adjacent to each respective area, i.e., when there are only first and second divided areas stored data of the first divided area would be included with select pixel data of the second divided area and/or the second divided area would be included with select pixel data of the first divided area. Thus, in an embodiment, the data storage unit 120 may include frame buffers for N number of the at least two divided areas of the video data, e.g., ranging from 120-1 to 120-n. Further, each frame buffer 120-1 to 120-n may respectively store pixel data for a corresponding divided area and a portion of pixel data of a different divided area adjacent to each corresponding divided area.

Figure 2:
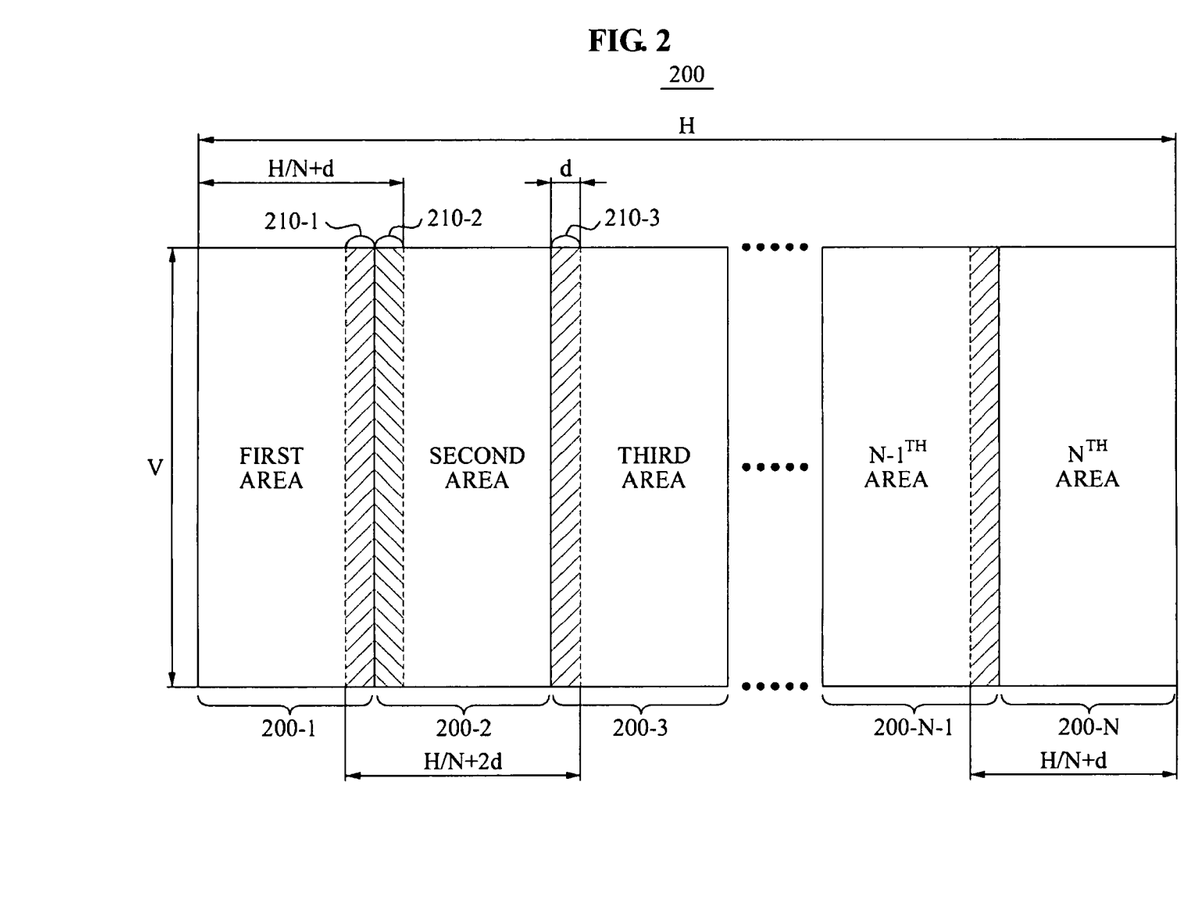
FIG. 2 illustrates a division of video data in a lengthwise direction, according to one or more embodiments.

For example, FIG. 2 illustrates a division of video data 200 in a lengthwise direction, according to one or more embodiments. Here, for example, the video division unit 110 of FIG. 1 may receive a (V×H) size of video data 200 and divide the video data 200 into N areas 200-1 through 200-N in a lengthwise direction. Accordingly, in an embodiment, the first frame buffer 120-1 may store pixel data for the first area 200-1 and pixel data for a portion 210-2 of the second area 200-2, adjacent to the first area 200-1. Likewise, the second frame buffer 120-2 may store pixel data for the second area 200-2 and pixel data for a portion 210-1 of the first area 200-1, adjacent to the second area 200-2.

Thus, the video processing unit 130 may process pixel data around the division boundary between the at least two divided areas, e.g., pixel data within a defined distance or pixel/block unit from the division boundary, by referring to the pixel data in each the at least two divided areas and a portion of a predetermined amount of pixel data corresponding to the adjacent divided area(s).

As an example, the video processing unit 130 may process the divided video data by filtering the pixel data around the division boundary of the at least two divided areas based on the portion of pixel data in an adjacent divided area.

As another example, the video processing unit 130 may process the divided video data by searching for motion vectors of blocks around the division boundary based on the portion of pixel data in the adjacent divided area.

The video processing unit 130 may include image processors, such as image processors 130-1 through 130-n, which may be matched with each of the frame buffers 120-1 through 120-n, for example, and may process pixel data of a current divided area with pixel data of the adjacent divided area by referring to the portion of the pixel data in the adjacent divided area stored in the each of the frame buffers 120-1 through 120-n being matched with the respective image processors 130-1 through 130-n, e.g., frame buffer 120-1 may be accessed for pixel data of the current divided area and the portion of the pixel data of the adjacent divided area when processing the current divided area. That is, the video processing unit 130 may process pixel data around the different division boundaries of the divided video data in parallel by referring to the portion of the pixel data from the adjacent area stored in each of the respective frame buffers 120-1 through 120-n matched with the respective image processors 130-1 through 130-n. Though an embodiment has been described with the frame buffer for a current divided area storing both the pixel data for the current divided area and a portion of the pixel data for an adjacent area, embodiments are not limited thereto and alternate storage arrangements may be made for the portion of the pixel data of the adjacent area.

As noted, FIG. 2 illustrates a division of video data 200 in a lengthwise direction, according to one or more embodiments, with the video division unit 110 of FIG. 1 receiving an example (V×H) size of video data 200 and dividing the video data 200 into N areas 200-1 through 200-N in a lengthwise direction.

In the aforementioned embodiment, the data storage unit 120 may store, in the first frame buffer 120-1, pixel data in a first area 200-1 and a portion 210-2 of pixel data, e.g., as an amount of (V×d) of a second area 200-2, adjacent to the first area 200-1, (V×(H/N+d)).

Likewise, the data storage unit 120 may store, in the second frame buffer 120-2, pixel data in the second area 200-2, a portion 210-1 of pixel data, e.g., as an amount of (V×d) of the first area 200-1, adjacent to the second area 200-2, and a portion 210-3 of pixel data, e.g., as an amount of (V×d) of a third area 200-3, adjacent to the second area 200-2, (V×(H/N+2d)).

As still another example, the data storage unit 120 may store, in an $(N-1)^{th}$ frame buffer, pixel data in an $(N-1)^{th}$ area 200-N-1, a portion of pixel data, e.g., as an amount of (V×d) of an $(N-2)^{th}$ area, adjacent to the $(N-1)^{th}$ area 200-N-1, a portion of pixel data, e.g., as an amount of (V×d) of the $N^{th}$ area 200-N, adjacent to the $(N-1)^{th}$ area 200-N-1, (V×(H/N+2d)).

As yet another example, the data storage unit 120 may store, in an $N^{th}$ frame buffer 120-n, pixel data in an $N^{th}$ area 200-N and a portion of pixel data as amount of (V×d) of the $(N-1)^{th}$ area 200-N-1, adjacent to the $N^{th}$ area 200-N, (V×(H/N+d)).

The video processing unit 130 may, thus, process pixel data around a division boundary of the divided video data by referring to a portion of pixel data in such an adjacent area, stored in each of the frame buffers 120-1 through 120-n respectively matched with the N image processors 130-1 through 130-n.

As an example, when video data in the first area 200-1 is processed, the video processing unit 130 may process pixel data around a division boundary of the first area 200-1 by referring to the portion 210-2 of pixel data as an amount of (V×d) of the second area 200-2, adjacent to the first area 200-1, as stored in the first frame buffer 120-1 with pixel data for the first area 200-1.

As another example, when video data in the second area 200-2 is processed, the video processing unit 130 may process pixel data around a division boundary of the second area 200-2, via a second image processor 130-2, by referring to the portion 210-1 of pixel data in the first area 200-1 adjacent to the second area 200-2 and the portion 210-3 of pixel data in a third area 200-3 adjacent to the second area 200-2, as stored in the second frame buffer 120-2 with pixel data for the second area 200-2.

As still another example, when video data in the $(N-1)^{th}$ area 200-N-1 is processed, the video processing unit 130 may process pixel data around a division boundary of the $(N-1)^{th}$ area 200-N-1, via a $(N-1)^{th}$ image processor, by referring to a portion of pixel data in an $(N-2)^{th}$ area adjacent to the $(N-1)^{th}$ area 200-N-1 and a portion of pixel data in the $n^{th}$ area 200-N adjacent to the $(N-1)^{th}$ area 200-N-1, as stored in the N-1 frame buffer with pixel data for the $(N-1)^{th}$ area 200-N-1.

As yet another example, when video data in the $N^{th}$ area 200-N is processed, the video processing unit 130 may process pixel data around a division boundary of the $N^{th}$ area 200-N, via the $N^{th}$ image processor 130-n, by referring to a portion of the pixel data of the $(N-1)^{th}$ area 200-N-1 adjacent to the $N^{th}$ area 200-N, as stored in the $N^{th}$ frame buffer 120-n with pixel data for the $N^{th}$ area 200-N.

As described above, the video processing apparatus 100 may divide video, e.g., ultra-high resolution, via the video division unit 110, and refer to pixels belonging to other divided areas which are stored in the respective frame buffers 120-1 through 120-n, included in the data storage unit 120, for the respective divided area being processed. Thus, with such an arrangement, pixels for differing divided areas may be processed in parallel via the image processors 130-1 through 130-n included in the video processing unit 130, and the video processing apparatus 100 may thus process video as quickly as a number of divided areas without artifacts occurring around a division boundary, again noting that alternative embodiments are equally available.

Figure 3:
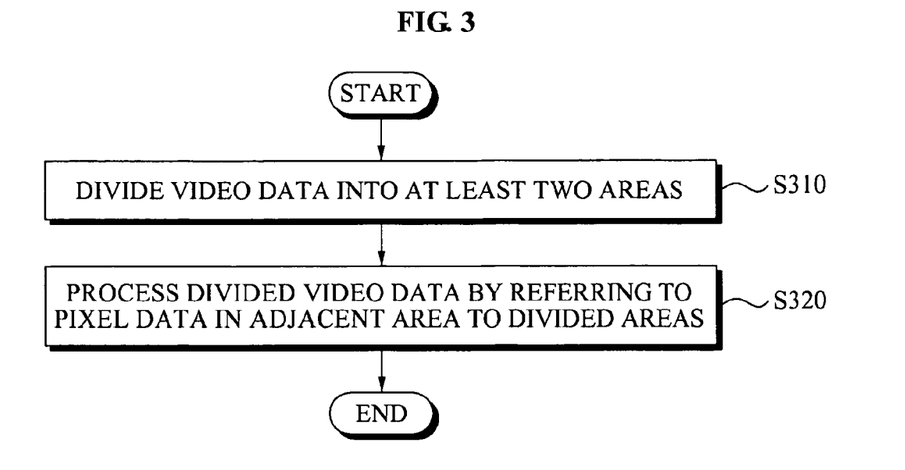
FIG. 3 illustrates a video processing method, according to one or more embodiments.

FIG. 3 illustrates a video processing method, according to one or more embodiments.

Referring to FIG. 3, video data may be divided into at least two areas, in operation S310. That is, the video data may be divided into at least two areas based on a predetermined direction, for example, in operation S310. In an embodiment, when the predetermined direction is a lengthwise direction, the video data may be divided into at least two areas in a lengthwise direction in operation S310. In another embodiment, when the predetermined direction is a heightwise direction, the video data may be divided into at least two areas in a heightwise direction. In another embodiment, the video data may be divided into at least two areas in a lengthwise direction and again divided into at least two areas in a heightwise direction, when the predetermined direction is lengthwise direction and a heightwise direction. Here, further embodiments of differing predetermined division directions are equally available, as well as their differing combinations.

In operation S320, the divided video data for one divided area may be processed by referring to pixel data in a divided area adjacent to the divided area being processed. That is, the video processing apparatus may process pixel data around division boundaries of the divided areas by referring to the pixel data in the respective areas being processed and a portion, e.g., a predetermined amount, of pixel data of adjacent areas, in operation S320.

Thus, in an embodiment, in operation S320, divided video data may be processed by filtering pixel data around a corresponding division boundary, with respect to the divided area being processed and an adjacent divided area, based on a portion of pixel data in the adjacent divided area.

In an embodiment, in operation S320, the divided video data may be processed by searching for a motion vector of one or more blocks around the corresponding division boundary, with respect to the divided area being processed and an adjacent divided area, based on the portion of pixel data in the adjacent divided area.

As described above, in one or more embodiments, such video processing methods may overcome the generation of artifacts around division boundaries, as currently processed divided video data may be processed by referring to pixels included in other divided areas after division of video data into the divided areas.

Figure 4:
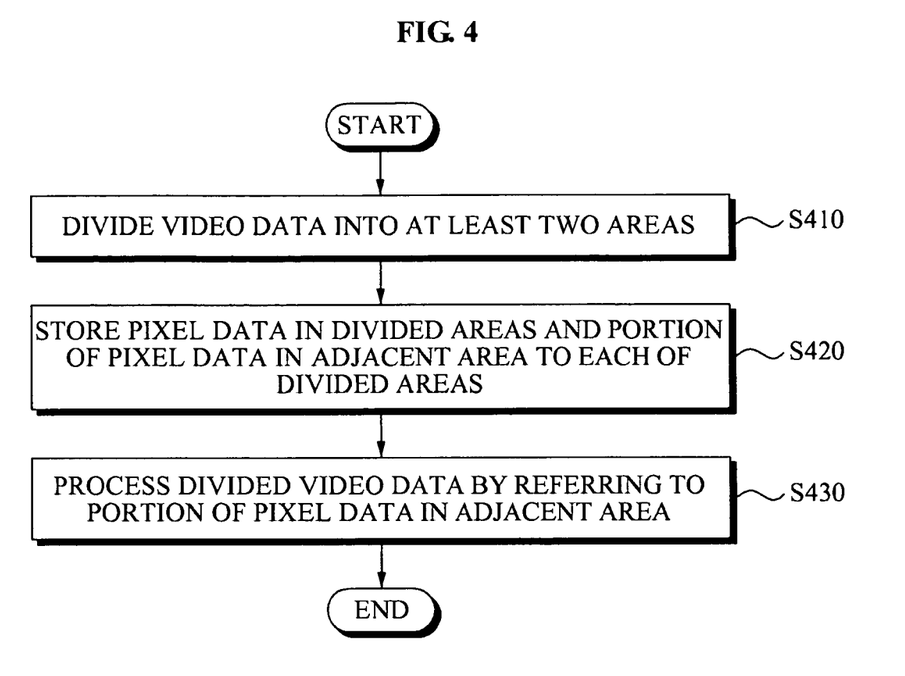
FIG. 4 illustrates a video processing method, according to one or more embodiments.

FIG. 4 illustrates a video processing method, according to one or more embodiments. Here, although method embodiments may correspond to sequential processes of the example apparatus illustrated in FIG. 1, embodiments are not limited thereto and alternate embodiments with different sequencing are equally available. Regardless, such an embodiment will now be briefly described in conjunction with FIGS. 1 and 2 with repeated descriptions thereof being omitted.

Referring to FIGS. 1, 2 and 4, the video processing apparatus 100 may divide video data into at least two divided areas, in operation S410. That is, in operation S410, the video processing apparatus 100 may divide input video data into at least two divided areas through the video division unit 110 based on a predetermined direction.

In an embodiment, when the predetermined direction is a lengthwise direction, the video processing apparatus 100 may divide the input video data into at least two divided areas based on the lengthwise direction, e.g., through the video division unit 110. In embodiment, as shown in FIG. 2, when the input video data is video data 200 of a (V×H) size, the video processing unit 110 may divide the video data 200 into an N areas 200-1 to 200-N based on the lengthwise direction via the video processing apparatus 100.

In an embodiment, when the predetermined direction is a heightwise direction, the video processing apparatus 100 may divide the input video data into at least two divided areas based on the heightwise direction.

In another embodiment, when the predetermined direction is a heightwise direction and a lengthwise direction, the video processing apparatus 100 may divide the input video data into at least two divided areas based on the heightwise direction and the lengthwise direction.

In operation S420, the video processing apparatus 100 may respectively store pixel data for the divided areas and a portion of pixel data of an adjacent divided area, e.g., via the data storage unit 120. That is, in an embodiment, the video processing apparatus 100 may store the pixel data of a divided area along with portions of pixel data, corresponding to the boundary areas, of adjacent divided areas in every frame buffer 120-1-120-n of a data storage unit 120.

In an embodiment, in operation S420, as illustrated in FIG. 2, the video processing apparatus 100 may store pixel data (V×H/N) of the first area 200-1, divided from the video data 200, along with a portion of pixel data 210-2 of a predetermined amount (V×d) of the second area 200-2 adjacent to the first divided area 200-1, in the first frame buffer 120-1, (V×(H/N+d)).

In an embodiment, in operation S420, as illustrated in FIG. 2, the video processing apparatus 100 may store the pixel data (V×H/N) of the second area 200-2, divided from the video data 200, a portion of pixel data 210-1 of the predetermined amount (V×d) of the first area 200-1 adjacent to the second divided area 200-2, and a portion of pixel data 210-3 of the predetermined amount (V×d) of the third area 200-3 adjacent to the second area 200-2, divided from the video data 200, collectively in the second frame buffer 120-2, (V×(H/N+2d)).

In an embodiment, in operation S420, as illustrated in FIG. 2, the video processing apparatus 100 may further store the pixel data of the $(N-1)^{th}$ area 200-N-1, divided from the video data 200, along with a portion of pixel data of the predetermined amount (V×d) of the $(N-2)^{th}$ area adjacent to the $(N-1)^{th}$ area 200-N-1, and a portion of pixel data of the predetermined amount (V×d) in the $N^{th}$ area 200-N adjacent to the $(N-1)^{th}$ area 200-N-1, collectively in the $(N-1)^{th}$ frame buffer, (V×(H/N+2d)).

In another embodiment, in operation S420, as illustrated in FIG. 2, the video processing apparatus 100 may store the pixel data of the $N^{th}$ area 200-N, divided from the video data 200, along with a portion of pixel data of the predetermined amount (V×d) of the $(N-1)^{th}$ area 200-N-1 adjacent to the $N^{th}$ area 200-N, collectively in the $N^{th}$ frame buffer 120-n, (V×(H/N+d)).

In operation S430, the video processing apparatus 100 may process an area of the divided video data, e.g., via the video processing unit 130, by referring to a portion of pixel data of an adjacent divided area stored in the data storage unit 120. In operation S430, the video processing apparatus 100 may further process pixel data of the divided area, around a division boundary of the divided area and adjacent divided area(s), by referring to a portion of pixel data of a predetermined amount of the adjacent area(s), stored in the data storage unit 120.

In an embodiment, in operation S430, the video processing apparatus 100 may process an area of the divided video data, e.g., via the video processing unit 130, by filtering pixel data around the division boundaries of the divided area based on portion(s) of pixel data of adjacent divided area(s), stored in the data storage unit 120.

In another embodiment, in operation S430, the video processing apparatus 100 may process an area of the divided video data, e.g., via the video processing unit 130, by referring to portion(s) of pixel data in adjacent divided area(s), stored in the data processing unit 120, and search for motion vector(s) of one or more blocks around the division boundaries of the divided area.

As described above, in one or more embodiments, video data processing methods may process divided video while minimizing artifact generation around division boundaries of the divided video, as the video data, e.g., ultra-high resolution video, is divided into at least two divided areas and both a pixel of a respective divided area and pixel data of a divided area adjacent to the respective divided area are referred to during processing.

In operation 430, as noted, the video processing apparatus 100 may process the respective pixel data in the divided areas by referring to a portion of pixel data in an adjacent divided area, stored in respective frame buffers 120-1 to 120-n included in the data storage unit 120, where each of frame buffers 120-1 to 120-n respectively correspond to the image processors 130-1 to 130-n. In operation 430, the video processing apparatus 100 may process, in parallel, for each divided area of divided video data, the pixel data around division boundaries of each divided area by referring to the portion of pixel data stored in the same frame buffers 120-1 to 120-n, respectively corresponding to the image processors 130-1 to 130-n, used for accessing the pixel data of each divided area.

In an embodiment, when video data of the first area 200-1 is processed, in operation 430, the video processing apparatus 100 may process pixel data around the division boundary of the first area 200-1, via the first image processor 130-1 included in the video processing unit 130, by referring to the portion 210-2 of pixel data of a predetermined amount of the second area 200-2 adjacent to the first area 200-1, stored in the first frame buffer 120-1 with the pixel data of the first area 200-1.

Likewise, in an embodiment, when video data of the second area 200-2 is processed, in operation 430, the video processing apparatus 100 may process pixel data around the division boundary of the second area 200-2, via the second image processor 130-2 included in the video processing unit 130, by referring to a portion 210-1 of pixel data of the first area 200-1 adjacent to the second area 200-2 and a portion 210-3 of pixel data of in the third area 200-3 adjacent to the second area 200-2, both stored in the second frame buffer 120-2 with the pixel data of the second area 200-2.

In another embodiment, when video data of the $(N-1)^{th}$ area 200-N-1 is processed, in operation 430, the video processing apparatus 100 may process the pixel data around the division boundary of the $(N-1)^{th}$ area 200-N-1, via a $(N-1)^{th}$ image processor(not shown) included in the video processing unit 130, by referring to a portion of pixel data in the $(N-2)^{th}$ area adjacent to $(N-1)^{th}$ area 200-N-1 and a portion of pixel data in the $N^{th}$ area 200-N adjacent to the $(N-1)^{th}$ area 200-N-1, both stored in the $(N-1)^{th}$ frame buffer with the pixel data of the $(N-1)^{th}$ area 200-N-1.

In a further embodiment, when video data of the $N^{th}$ area 200-N still further processed, in operation 430, the video processing apparatus 100 may process pixel data around the division boundary of the $N^{th}$ area 200-N, via the $N^{th}$ image processor 130-n in the video processing unit 130, by referring to a portion of pixel data of a predetermined amount of the $(N-1)^{th}$ area 200-N-1 adjacent to the $N^{th}$ area 200-N, stored in the Nth frame buffer 120-n with the pixel data of the $N^{th}$ area 200-N.

As described above, in one or more embodiment, video processing methods may process a video as quickly as the number of divided areas, while minimizing artifacts generation around division boundaries between the divided areas, and the divided areas may thus be processed in parallel by referring to pixels included in other divided areas but accessible to a currently processed divided area.

In addition to the above described embodiments, embodiments can also be implemented through computer readable code/instructions in/on a medium, e.g., a computer readable medium, to control at least one processing device to implement any above described embodiment. The medium can correspond to any defined, measurable, and tangible structure permitting the storing and/or transmission of the computer readable code.

The computer readable code can be recorded included in/on a medium, such as a computer-readable media, and the computer readable code may include program instructions to implement various operations embodied by a processing device, such a processor or computer, for example. The media may also include, e.g., in combination with the computer readable code, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like.

Examples of computer readable code include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include the aforementioned processor or computer, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A video processing apparatus, comprising:
a video division processor configured to divide video data into at least two divided areas of video data;
a video processor configured to process the divided video data of one of the divided areas by referencing select pixel data of an adjacent divided area, the divided video data being processed separate from pixel data, including the select pixel data, of the adjacent divided area; and
a data storage medium comprising at least one data buffer, wherein a first data buffer among the at least one data buffer is configured to store the pixel data of the one divided area together with the select pixel data of the adjacent divided area.

2. The video processing apparatus of claim 1, wherein the at least one data buffer further comprises a second data buffer storing the pixel data of the adjacent divided area together with a portion of the pixel data from the one divided area.

3. The video processing apparatus of claim 1, wherein the video processing unit processes pixel data of the one divided area around a division boundary between the one divided area and the adjacent divided area by referring to the pixel data in the one divided area and a portion of the pixel data, of a predetermined amount, of the adjacent divided area.

4. The video processing apparatus of claim 3, wherein the video processing unit processes the pixel data of the one divided area around the division boundary by filtering the pixel data of the one divided area around the division boundary by referring to the portion of the pixel data of the adjacent divided area.

5. The video processing apparatus of claim 3, wherein the video processing unit processes the pixel data of the one divided area around the division boundary by searching for a motion vector of a block of the one divided area around the division boundary with reference to the adjacent divided area.

6. The video processing apparatus of claim 1, wherein the video processing unit processes pixel data of respective divided areas, of the at least two divided areas, around division boundaries between the respective divided areas, in parallel, with each processing of the respective divided areas including a referring to portions of pixel data of another divided area adjacent to the respective divided areas.

7. A video processing apparatus, comprising:
a video division processor configured to divide video data into plural divided areas of video data;
a data storage medium comprising at least one data buffer, wherein a first data buffer among the at least one data buffer is configured to store pixel data of a respective first divided area, among the plural divided areas, together with a portion of pixel data of an adjacent divided area; and
a video processor configured to process in parallel, the pixel data of the respective first divided area with each of the remaining divided areas of the plural divided areas by referencing the portion of pixel data of the adjacent divided area stored in the first data buffer, the pixel data of the respective first divided area being processed separate from pixel data, including the portion of pixel data, of each of the remaining divided areas.

8. The video processing apparatus of claim 7, wherein the at least one data buffer further comprises a second data buffer storing the pixel data of the adjacent divided area together with a portion of the pixel data of the first divided area.

9. A video processing method, comprising:
dividing video data into at least two divided areas of video data;
processing the divided video data by processing pixel data of one divided area of the at least two divided areas by referencing select pixel data of an adjacent divided area, the divided video data being processed separate from pixel data, including the select pixel data, of the adjacent divided area; and
storing the pixel data of the one divided area together with the select pixel data of the adjacent divided area in a first data buffer among at least one data buffer in a data storage medium.

10. The video processing method of claim 9, wherein the storing the pixel data further comprises storing the pixel data of the adjacent divided area together with a portion of the pixel data from the one divided area in a second data buffer among the at least one data buffer.

11. The video processing method of claim 9, wherein the processing of the divided video data processes pixel data of the one divided area around a division boundary between the one divided area and the adjacent divided area by referring to the pixel data in the one divided area and a portion of the pixel data, of a predetermined amount, of the adjacent divided area.

12. The video processing method of claim 11, wherein the processing of the divided video data processes the pixel data of the one divided area around the division boundary by filtering the pixel data of the one divided area around the division boundary by referring to the portion of the pixel data of the adjacent divided area.

13. The video processing method of claim 11, wherein the processing of the divided video data processes the pixel data of the one divided area around the division boundary by searching for a motion vector of a block of the one divided area around the division boundary with reference to the adjacent divided area.

14. The video processing method of claim 9, wherein the processing of the divided video data processes pixel data of respective divided areas, of the at least two divided areas, around division boundaries between the respective divided areas, in parallel, with each processing of the respective divided areas including a referring to portions of pixel data of another divided area adjacent to the respective divided areas.

* * * * *